(12) United States Patent
Kaneko et al.

(10) Patent No.: US 6,241,843 B1
(45) Date of Patent: *Jun. 5, 2001

(54) MULTILAYER OPTICAL DISK

(75) Inventors: Masahiko Kaneko, Kanagawa; Nobuhiko Umezu; Katsuhisa Aratani, both of Chiba; Ariyoshi Nakaoki, Tokyo, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,277

(22) Filed: May 28, 1998

Related U.S. Application Data

(63) Continuation of application No. 08/629,564, filed on Apr. 9, 1996, now Pat. No. 5,766,717.

(30) Foreign Application Priority Data

Apr. 11, 1995 (JP) .................................................. 7-085369
Apr. 19, 1995 (JP) .................................................. 7-094068

(51) Int. Cl.$^7$ ..................................................... B32B 31/06
(52) U.S. Cl. .................. 156/245; 156/275.5; 156/275.7; 428/65.2; 369/286; 369/94; 359/589
(58) Field of Search ..................... 156/245, 273.7, 156/275.5, 275.7, 275.3, 291, 295, 60; 369/286, 288, 283, 275.1, 94, 44.12, 44.37; 428/64.4, 65.2; 359/586, 588, 589

(56) References Cited

U.S. PATENT DOCUMENTS

| | | | |
|---|---|---|---|
| 4,450,553 | 5/1984 | Holster et al. . | |
| 4,990,208 * | 2/1991 | Kano | 516/275.3 |
| 5,244,774 | 9/1993 | Usami et al. . | |
| 5,502,595 * | 3/1996 | Kuo et al. | 359/589 |
| 5,526,338 * | 6/1996 | Hasman et al. | 369/94 |
| 5,540,966 * | 7/1996 | Hintz | 428/64.4 |
| 5,828,648 * | 10/1998 | Takasu et al. | 369/275 |

FOREIGN PATENT DOCUMENTS

0 368 442  5/1990 (EP) .
0 520 619  12/1992 (EP) .

* cited by examiner

*Primary Examiner*—Jeff H. Aftergut
*Assistant Examiner*—Michael A. Tolin
(74) *Attorney, Agent, or Firm*—Sonnenschein, Nath & Rosenthal

(57) ABSTRACT

A multilayer optical disk having an information storage layer which can as well as be reproduced by a general purpose reproducing apparatus, for example, a compact disk player, and from which information can be read from other information storage layers by using an exclusive reproducing apparatus. The method of manufacturing a multilayer disk comprises the steps of forming a first substrate having a first information storage area enabling reproduction of information therein with a first light beam having a wavelength of 770 nm to 830 nm; forming a second substrate having a second information storage area enabling reproduction of information therein with a second light beam having a wavelength of 615–655 nm but which is relatively transparent with respect to said first light beam; and bonding said first substrate to said second substrate together without said first and second said information areas facing each other.

10 Claims, 6 Drawing Sheets

MULTILAYER OPTICAL DISK

RELATED APPLICATION DATA

This application claims priority to and is a continuation of U.S. patent application Ser. No. 08/629,564 filed Apr. 9, 1996, now U.S. Pat. No. 5,766,717. This application also claims priority to Japanese patent applications Nos. P07-085369 filed Apr. 11, 1995 and P07-094068 filed Apr. 19, 1995. The disclosures of all of the foregoing applications are incorporated herein by reference to the extent permitted by law.

BACKGROUND OF THE INVENTION

The present invention relates to a multilayer optical disk having a multilayer structure consisting of a plurality of layers for storing information.

In recent years, the popularity of so-called multimedia results in a necessity of handling large-capacity information such as a digital movie data. Therefore, a necessity arises in that large-capacity information of the foregoing type must be stored and randomly accessed so as to be reproduced, if need arises.

An optical disk is a storage medium permitting random access, exhibiting a large capacity and capable of being ejected (i.e., being removable) from a playback or reproducing apparatus. Therefore, optical disks have been used in a variety of fields and large quantities. In order to enlarge the capacity as described above, one side of the optical disk must be capable of handling large-capacity information.

Under the foregoing circumstance, the capacity of the optical disk has been enlarged by providing for a multiplicity of layers for storing information that are laminated in the direction of the thickness of the optical disk.

In such a multilayer optical disk, a multilayer structure is formed on one side thereof and consists of information layers for storing information, wherein the focal points are made so as to be different from one another among the multiple layers so that information is read while maintaining a random access characteristic and, therefore, large-capacity information is handled by a large capacity.

Reported and representative multilayer optical disks will now be described.

1. A concept for reproducing the optical disk by making the positions of the focal points to be different from one another is reported, for example, U.S. Pat. No. 3,946,367.

2. A method using a multilayer disk having an information layer formed by laminating a plurality of layers on one side of the disk so that information is read by means of transmitted light or reflected light is reported, for example, U.S. Pat. No. 4,219,704.

3. A system for reproducing information from a multilayer optical disk, the system comprising an optical system having an aberration correction function (refer to U.S. Pat. No. 5,202,875).

In order to reproduce data in a conventional multilayer optical disk of the foregoing type, an exclusive apparatus for reproducing the data in the optical disk is required. For example, there arises a requirement for a reproducing optical system capable of independently reproducing a reproduction signal from the first information storage layer or the second information storage layer without mixing of data. As an alternative to this, a signal processing system is required which is capable of distinguishing reproduction signals from the first information storage layer and the second information storage layer from each other so as to extract information without confusion.

Therefore, a reproducing apparatus, such as a compact disk player for reproducing a so-called compact disk (CD) which has been used widely as a read-only optical disk, cannot be used as it is.

SUMMARY OF THE INVENTION

Accordingly, an object of the present invention is to provide a novel multilayer optical disk having an information storage layer, whose data on at least one information storage layer can be reproduced by a general purpose reproducing apparatus, such as a compact disk player, and whose data on another information storage layer can be reproduced by an exclusive reproducing apparatus.

To that end, in an embodiment, a method of manufacturing a multilayer optical disk, comprising the steps of:

forming a first substrate having a first information storage area enabling reproduction of information therein with a first light beam having a wavelength of 770 nm to 830 nm; forming a second substrate having a second information storage area enabling reproduction of information therein with a second light beam having a wavelength of 615–655 nm but which is relatively transparent with respect to said first light beam; and bonding said first substrate to said second substrate together without said first and second said information areas facing each other.

In an embodiment, the invention provides that the first substrate is formed using an injection molding process.

In an embodiment, the invention provides that the second substrate is formed using an injection molding process.

In an embodiment, the invention provides that the first information storage area comprises an Al film layer.

In an embodiment, the invention provides that the second information storage area comprises one or more layers of a Si—N film.

In an embodiment, the invention provides that the first information storage area has a reflection factor of about 70% or more with respect to the first light beam.

In an embodiment, the invention provides that the second information storage area has a reflection factor of 20% or more with respect to the second light beam.

In an embodiment, the invention provides that when the second substrate is formed, projections corresponding to recording pits are formed thereon.

In an embodiment, the invention provides that the first substrate is formed with projections thereby corresponding to recording pits formatted on a compact disk recording format.

These and other features of the invention are discussed in greater detail below in the following detailed description of the presently preferred embodiments with reference to the accompanying drawings.

DESCRIPTION OF THE PREFERRED EMBODIMENTS

Figure 1:
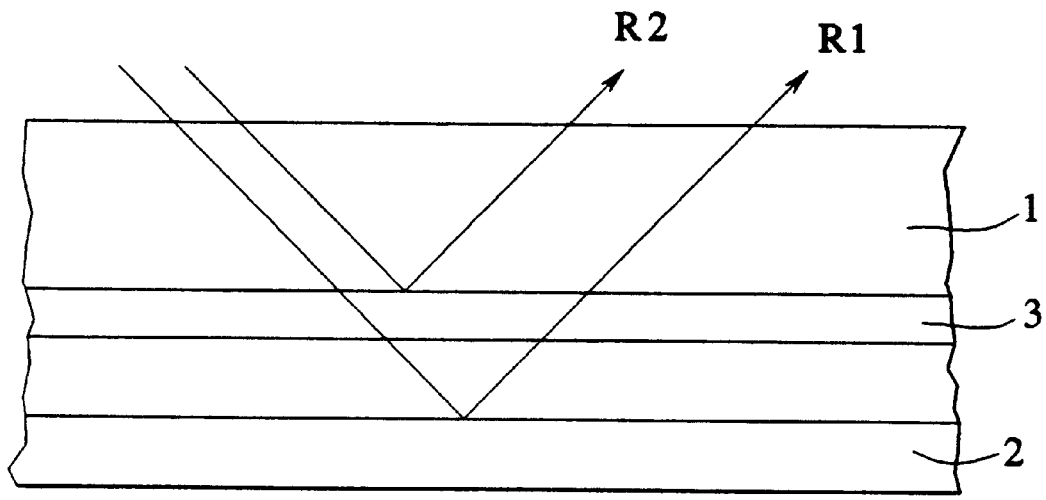
FIG. 1 is a schematic view showing the basic structure of a multilayer optical disk according to the present invention.
Figure 2:
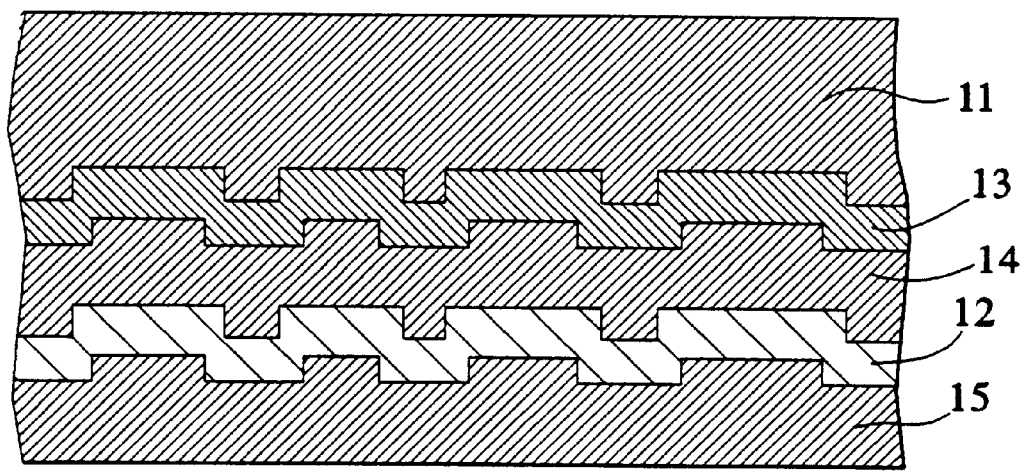
FIG. 2 is a schematic cross sectional view showing essential portions of an example of the structure of the multilayer optical disk according to the present invention.

Preferred embodiments of the present invention will now be described in detail with reference to the drawings.
First Embodiment As shown in FIG. 2, a multilayer optical disk according to this embodiment has a structure such that a second information-storage layer 13, a spacer layer or substrate 14 and a first information-storage layer 12 are, in this sequential order, formed on a substrate 11.

The substrate 11 is made of, for example, polycarbonate or glass. If the substrate 11 is made of polycarbonate, a so-called 2P method is employed in such a manner that a projection and pit pattern, such as recording pits, is formed as information to be exclusively reproduced. In this embodiment, a polycarbonate substrate having a thickness of 1.2 mm and made by injection molding is employed.

The second information-storage layer 13 is formed along the projection and pit pattern of the substrate 11 to reflect a portion of light beams made incident upon the substrate 11 and permit a portion of the light beam to transmit therethrough. Thus, the second information-storage layer 13 serves as a reflecting film for reading information in the form of the projection and pit pattern to be exclusively reproduced.

The spacer layer or substrate 14 is formed to optically separate the second information-storage layer 13 and the first information-storage layer 12 from each other. Therefore, the spacer layer 14 must have a certain thickness. Specifically, it is preferable that the spacer layer 14 be 30 mm or thicker. If the spacer layer 14 is too thin, light reflected by the first information-storage layer 12 and that reflected by the second information-storage layer 13 cannot sufficiently be separated from each other and, therefore, accurate detection cannot easily be performed. If the spacer layer 14 is too thick, spherical aberration and the like take place. Therefore, the thickness must be determined appropriately to prevent the foregoing problems.

The first information-storage layer 12 formed on the second information-storage layer 13 through the spacer layer 14 is made of a material having a high reflection factor. The reflection factor of the first information-storage layer 12 is 70% or higher with respect to a light beam having a wavelength of 770 nm to 830 nm.

To manufacture the foregoing multilayer optical disk, the substrate 11 is prepared initially, the substrate 11 having the projection and pit pattern, such as pits, formed to correspond to information signals to be read from the second information-storage layer 13. The substrate 11 may be made of either glass or plastic such as polycarbonate plastic. In the case where the glass substrate is employed, a so-called 2P (Photo Polymerization) method or the like is performed with which photosetting resin is enclosed between the glass substrate and a disk stamper, and then the photosetting resin is irradiated with light from a position on the outside of the glass substrate so that the projection and pit pattern is formed. Also in the case of the plastic substrate, the projection and pit pattern may be formed by the 2P method. However, an injection molding method using a stamper is generally employed to form the projection and pit pattern.

The second information-storage layer 13 is, on the substrate 11, formed by a vacuum evaporation method or a sputtering method.

Then, the spacer layer 14 is formed on the second information-storage layer 13. Since the spacer layer 14 must have a certain thickness, for example, a thickness of 30 μm or more, the spacer layer 14 is formed by applying ultraviolet- curing resin or the like by a spin coating method. The spacer layer 14 may be formed into a laminated shape by plural times of the laminating processes in each of which a layer having a thickness of μm to 10 μm is formed. The spacer layer 14 may be formed by bonding a transparent sheet.

Also the spacer layer 14 must have pits or the like formed to correspond to the information signals to be recorded on the first information-storage layer 12. The foregoing pits can be formed by the 2P method similar to the foregoing projection and pit pattern.

After the spacer layer 14 has been formed, the first information storage layer 12 is formed on the spacer layer 14. Then, if necessary, a protective film 15 is formed by ultraviolet-curing resin or the like.

In this embodiment, the second information-storage layer 13 on the substrate 11 is in the form of a five-layer structure film consisting of $Si_3N_4/SiO_2/Si_3N_4/SiO_2/Si_3N_4$ layers. The five layers respectively have thicknesses of 64 nm/90 nm/64 nm/90 nm/64 nm.

The refractive index n of $Si_3N_4$ is 2.0 and the extinction coefficient k of the same is 0, while the refractive index n of $SiO_2$ is 1.5 and the extinction coefficient k of the same is 0. As a matter of course, materials having similar optical characteristics may be employed to obtain a similar characteristic.

The first information-storage layer 12 is an Al film having a thickness of 100 nm.

Figure 3:
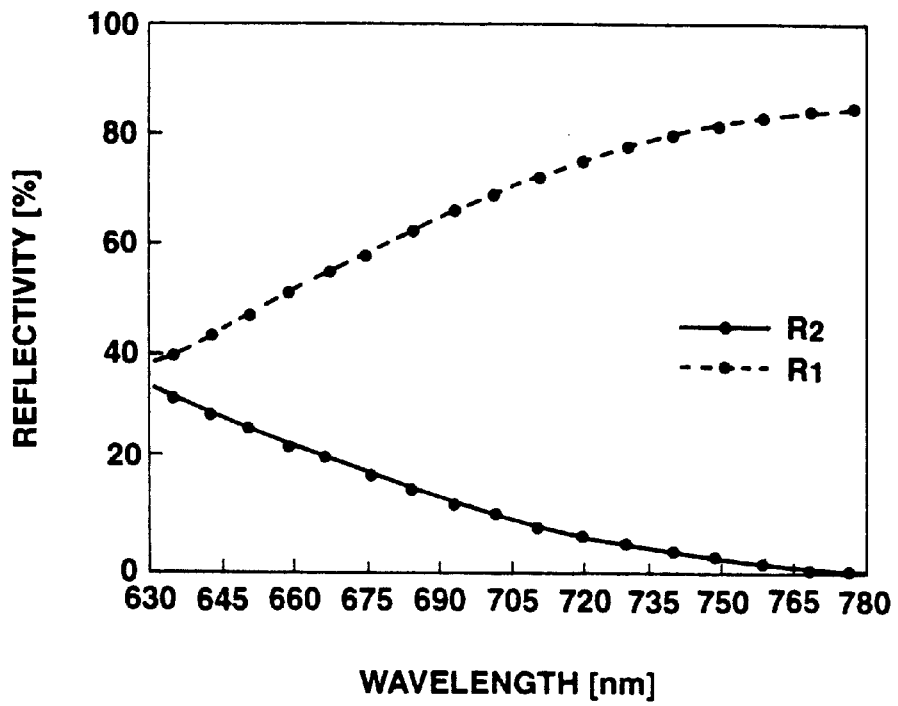
FIG. 3 is a graph showing the spectroscopic characteristic of the reflection factor of the multilayer optical disk shown in FIG. 2.

In the thus-structured multilayer optical disk, the reflection factor R2 of the second information-storage layer 13 (the five-layer structure film) has a spectroscopic characteristic as shown in FIG. 3 such that the reflection factor R2 is 34% with respect to light having a wavelength of 635 nm; and the reflection factor R2 is substantially zero with respect to light having the wavelength of 780 nm. That is, the second information-storage layer 13 has somewhat refractivity with respect to light having the wavelength of 635 nm and permits light having the wavelength of 780 nm to substantially transmit therethrough.

On the other hand, the first information-storage layer 12 (the Al film) has a reflection factor of 80% or higher with respect to both of light beams which have penetrated the second information-storage layer 13. Therefore, the reflection factor R1 of the first information-storage layer 12 with respect to the reproducing light beam is about 84% with respect to light having the wavelength of 780 nm which substantially penetrates the second information-storage layer 13 and about 38% with respect to light having the wavelength of 635 nm which has somewhat penetrated the second information-storage layer 13.

With the multilayer optical disk having the foregoing structure, use of the reproducing light beam having the wavelength of 780 nm enables reflected light to be obtained from only the first information-storage layer 12 so that information signals recorded on the first information-storage layer 12 are read. Since the reproducing light beam having the wavelength of 780 nm is used in the compact disk player and the like, the information signals recorded on the first information-storage layer 12 can as well as be reproduced by the foregoing general-purpose reproducing apparatus. Since both of the first information-storage layer 12 and the second information-storage layer 13 have the reflection factor of about 30% with respect to the reproducing light beam having the wavelength of 635 nm, information signals can be obtained from the two layers 12 and 13. Thus, the positions of the focal points of the reproducing light beams are made to be different from each other so that information is read from both of the first information-storage layer 12 and the second information-storage layer 13.

Second Embodiment

A multilayer optical disk was manufactured which comprised a second information-storage layer 13 in the form of a triple-layer structure film and other layers respectively having structures similar to those of the first embodiment. Note that the second information-storage layer 13 was in the form of a triple-layer structure film, the triple layers respectively being made of $Si_xN_{(1-x)}$ (n=2.8 and k=0)/$Si_3N_4$ (n=2 and k=0)/$Si_xN_{(1-x)}$ (n=2.8 and k=0) . The thicknesses of the respective layers were 40 nm/ 73 nm/40 nm.

Figure 4:
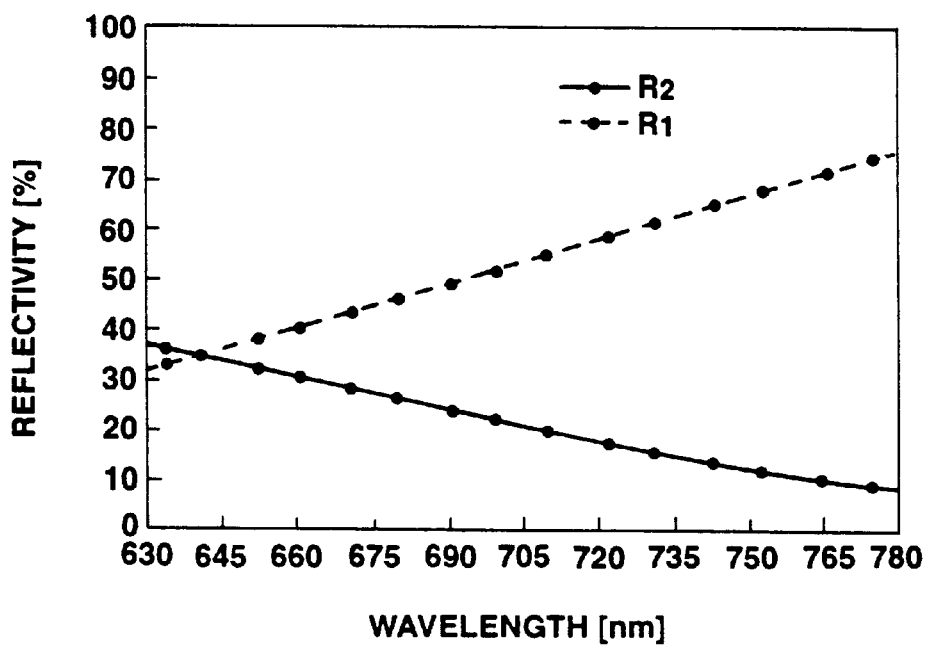
FIG. 4 is a graph showing the spectroscopic characteristic of the reflection factor of a multilayer optical disk having a second information-storage layer formed into a triple-layer structure.

Also in this embodiment, the reflection factor Ri of the first information-storage layer 12 and the reflection factor R2 of the second information-storage layer 13 have the spectroscopic characteristics as shown in FIG. 4. With the reproducing light beam having the wavelength of 780 nm, only the information signals recorded on the first information-storage layer 12 can be read. With the reproducing light beam having the wavelength of 635 nm, information signals can be read from both of the first information-storage layer 12 and the second information-storage layer 13.

Third Embodiment

In this embodiment, the second information-storage layer 13 is made of $Al_xGa_{(1-x)}As$ which is a semiconductor laser material and which has a thickness of 120 nm.

The first information-storage layer 12 is an Al film having a thickness of 100 nm. The other structures are the same as those according to the first embodiment.

Figure 5:
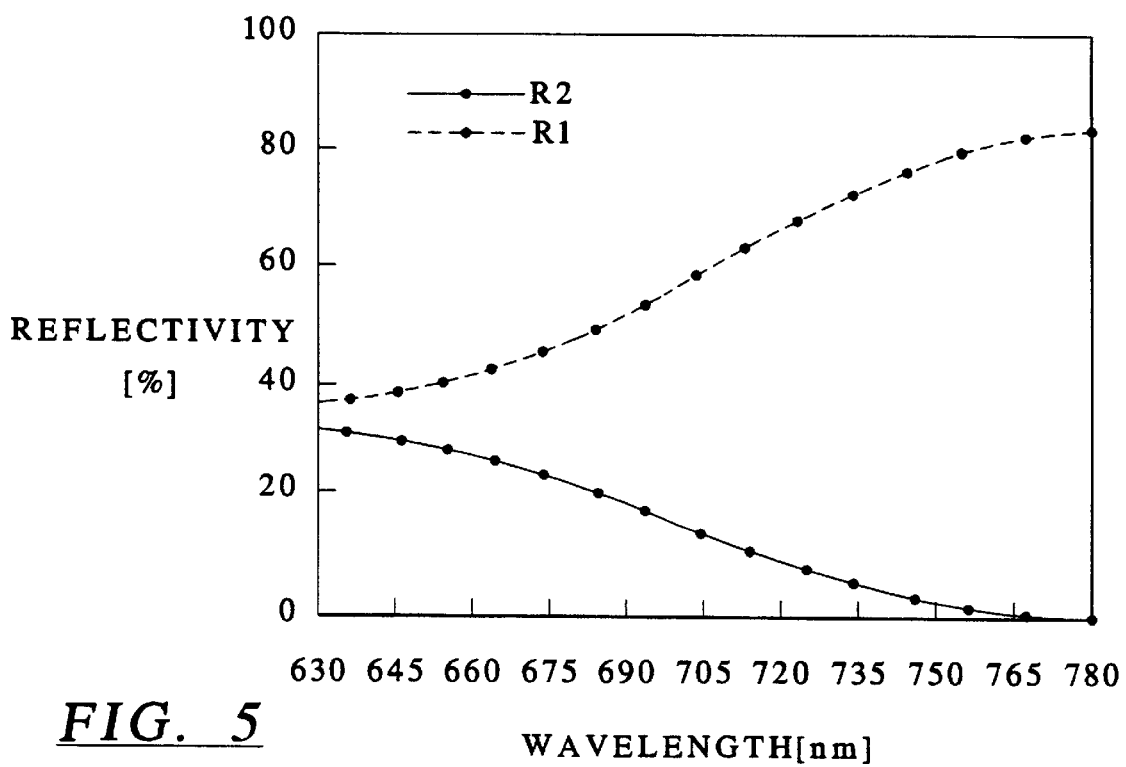
FIG. 5 is a graph showing the spectroscopic characteristic of the reflection factor of a multilayer optical disk having a second information-storage layer formed into a semiconductor layer material film.

In the multilayer optical disk structured as described above, the reflection factor R2 of the second information-storage layer 13 has a spectroscopic characteristic as shown in FIG. 5 such that the reflection factor is about 32% with respect to light having the wavelength of 635 nm and substantially zero with respect to light having the wavelength of 780 nm. That is, the second information-storage layer 13 has some refractivity with respect to light having the wavelength of 635 nm and permits light having the wavelength of 780 nm to substantially transmit therethrough.

On the other hand, the first information-storage layer 12 (the Al film) has a reflection factor of 80% or higher with respect to both of the light beams which have penetrated the second information-storage layer 13. Therefore, the reflection factor Ri of the first information-storage layer 12 with respect to light having the wavelength of 780 nm which substantially penetrates the second information-storage layer 13 is about 84% and the reflection factor R1 is about 36% with respect to light having the wavelength of 635 nm which has substantially penetrated the second information-storage layer 13.

With the multilayer optical disk having the foregoing structure, use of the reproducing light beam having the wavelength of 780 nm enables reflected light to be obtained from only the first information-storage layer 12 so that information signals are read from only the first information-storage layer 12. On the other hand, since both of the first information-storage layer 12 and the second information-storage layer 13 have the reflection factor of 30% or higher with respect to the reproducing light beam having the wavelength of 635 nm, information signals can be obtained from both of the layers 12 and 13. By making the positions of the focal points of the reproducing light beams to be different from each other, information can be read from the two layers 12 and 13.

Fourth Embodiment

Figure 6:
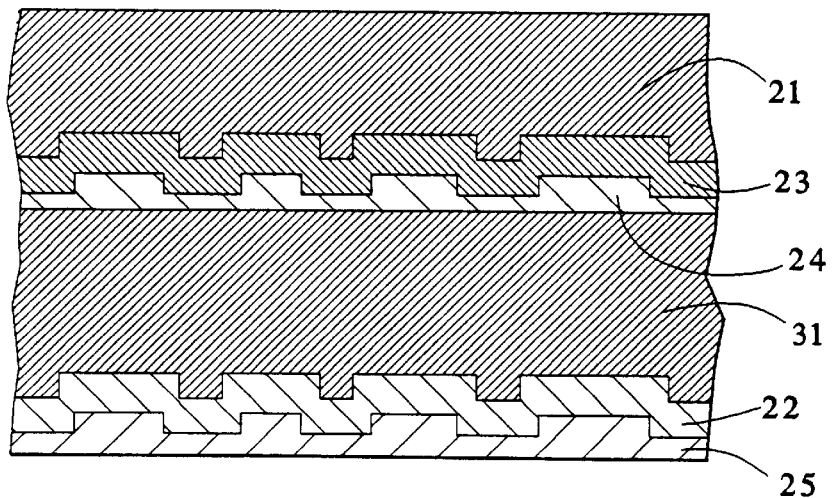
FIG. 6 is a schematic cross sectional view showing essential portions of an example of a multilayer optical disk having a structure comprising two substrates bonded to each other.

As shown in FIG. 6, this embodiment has a structure such that a second information-storage layer 23 is formed on a substrate 21 having a thickness of 0.6 mm;

and a first information-storage layer 22 is formed on a second substrate 31 having a thickness of 0.6 mm, the two substrates 21 and 31 being then bonded to each other through a bonding adhesive layer 24 having light transmission properties. Thus, a multilayer optical disk according to this embodiment is constituted.

Each of the substrates 21 and 31 is a polycarbonate substrate obtained by injection molding or a glass substrate manufactured by the 2P method. The structures of the information storage layers 22 and 23 are similar to those according to the first embodiment. A protective film 25 is formed on the first information-storage layer 22.

Also with the multilayer optical disk having the foregoing structure, similar to the first embodiment, reflected light was obtained from only the first information-storage to layer 22 with respect to the reproducing light beam having the wavelength of 780 nm. With respect to the reproducing light beam having the wavelength of 635 nm, reflected light was obtained from the first information-storage layer 22 and the second information-storage layer 23.

This embodiment may have another structure formed such that the first substrate and the second substrate are bonded to each other with the bonding adhesive layer 24 in such a manner that the first information-storage layer 22 and the second information-storage layer 23 face each other.

Fifth Embodiment

Figure 7:
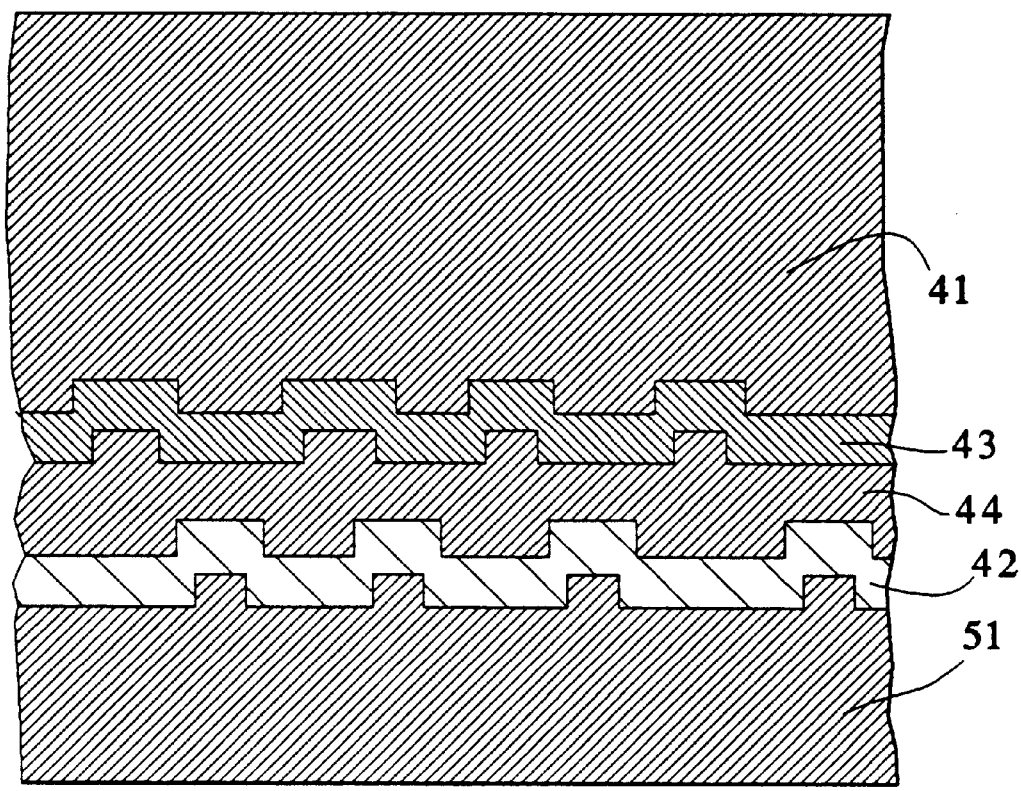
FIG. 7 is a schematic cross sectional view showing essential portions of another example of the multilayer optical disk having a structure comprising two substrates bonded to each other.

As shown in FIG. 7, this embodiment has a structure arranged such that a second information-storage layer 43 is formed on a first substrate 41 having a thickness of 1.2 mm, a first information-storage layer 42 is formed on a second substrate 51 having a thickness of 0.6 mm, and the first and second substrates 41 and 51 are, by a bonding adhesive layer 44, bonded to each other in such a manner that the information-storage layers 42 and 43 face each other.

Each of the substrates 41 and 51 is a polycarbonate substrate formed by injection molding. The structure of each of the information storage layers 42 and 43 is similar to that of the first embodiment.

Also with the multilayer optical disk having the foregoing structure, similar to the first embodiment, reflected light was obtained from only the first information-storage layer 42 with respect to the reproducing light beam having the wavelength of 780 nm. With respect to the reproducing light beam having the wavelength of 635 nm, reflected light was obtained from both of the first information-storage layer 42 and second information-storage layer 43.

Since this embodiment has the structure such that the first information-storage layer 42 and the second information-storage layer 43 are formed on the corresponding substrates 41 and 51, which are the polycarbonate substrates obtained by injection molding, a technique, such as the 2P method, is not required. Therefore, the multilayer optical disk according to this embodiment can significantly easily be manufactured.

Sixth Embodiment

Figure 8:
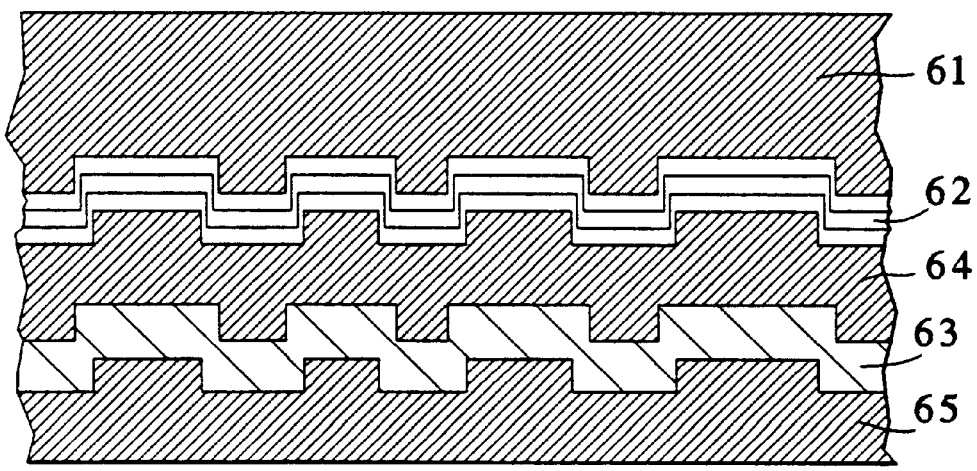
FIG. 8 is a schematic cross sectional view showing essential portions of a multilayer optical disk having a first information-storage layer formed adjacent to the substrate and formed by a triple-layer structure film.

As shown in FIG. 8, this embodiment has the structure arranged such that a first information-storage layer 62 was formed adjacent to a substrate 61, and then a second information-storage layer 63 was formed on the first information-storage layer 62 through a spacer layer of substrate 64.

The first information-storage layer 62 consists of three layers which respectively are made of $Si_xN$ (1−x)(n=3.5 and k=0)/$SiO_2$(n=1.5 and k=0)/$Si_xN_{(1-x)(n=}$3.5 and k=0) respectively having thicknesses of 45 nm/195 nm/45 nm.

The second information-storage layer was an Al film.

Figure 9:
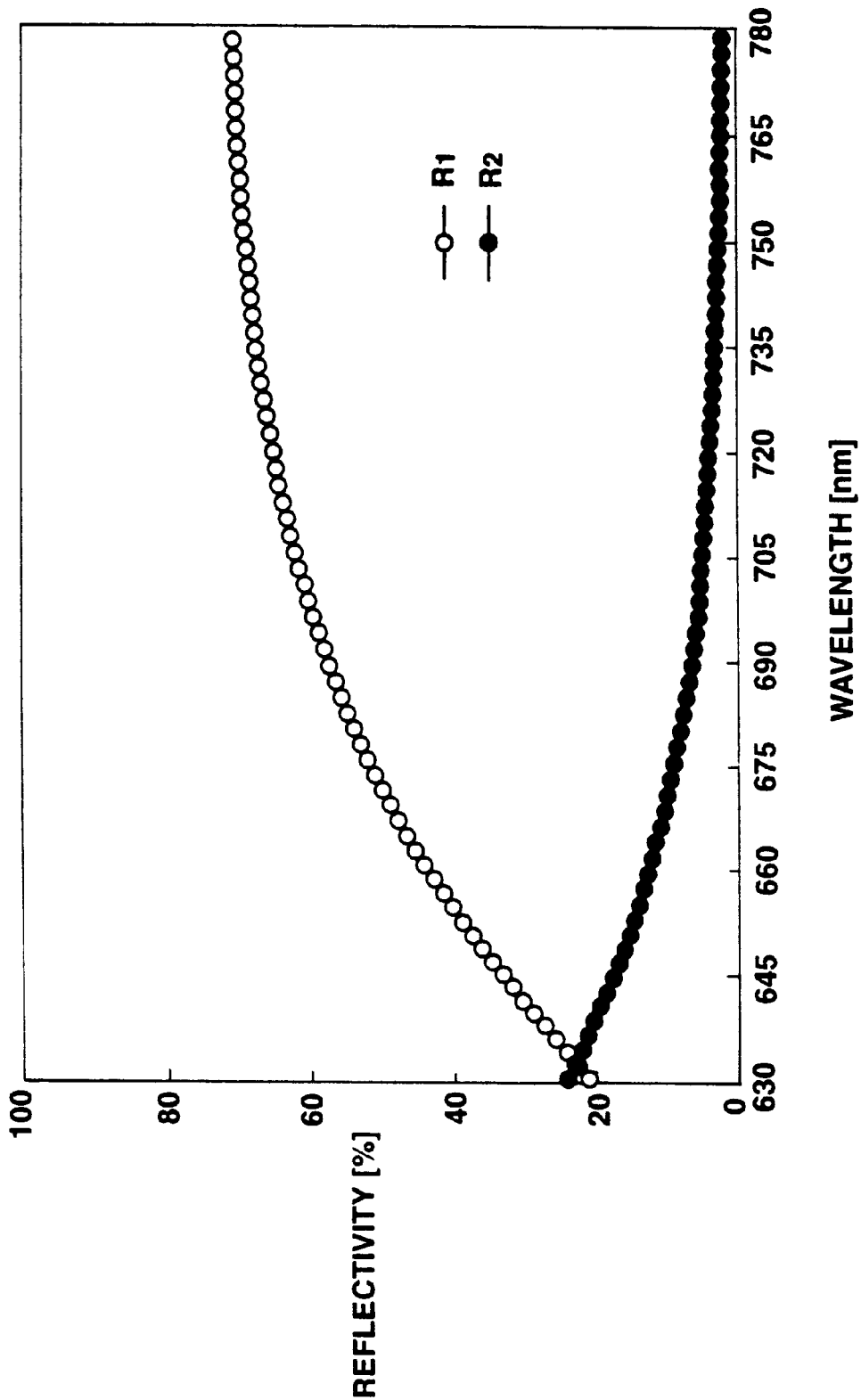
FIG. 9 is a graph showing the spectroscopic characteristic of the reflection factor of the multilayer optical disk shown in FIG. 7.

Also the multilayer optical disk having the foregoing structure enabled a spectroscopic characteristic of the reflection factor as shown in FIG. 9 to be obtained. With respect to the reproducing light beam having the wavelength of 780 nm, reflected light was obtained from only the first information-storage layer 62 as indicated by symbol R1 shown in FIG. 9. With respect to the reproducing light beam having the wavelength of 635 nm, the first information-storage layer had the light transmission properties so that reflected light was obtained from the second information-storage layer 63 as indicated by symbol R2 shown in FIG. 9.

Comparative Example

A multilayer optical disk was manufactured which comprised a Si films each having a thickness of 14 nm, the Si films being formed into the first and second information storage layers. Then, the spectroscopic characteristic of the reflection factor of each Si film was measured.

Figure 10:
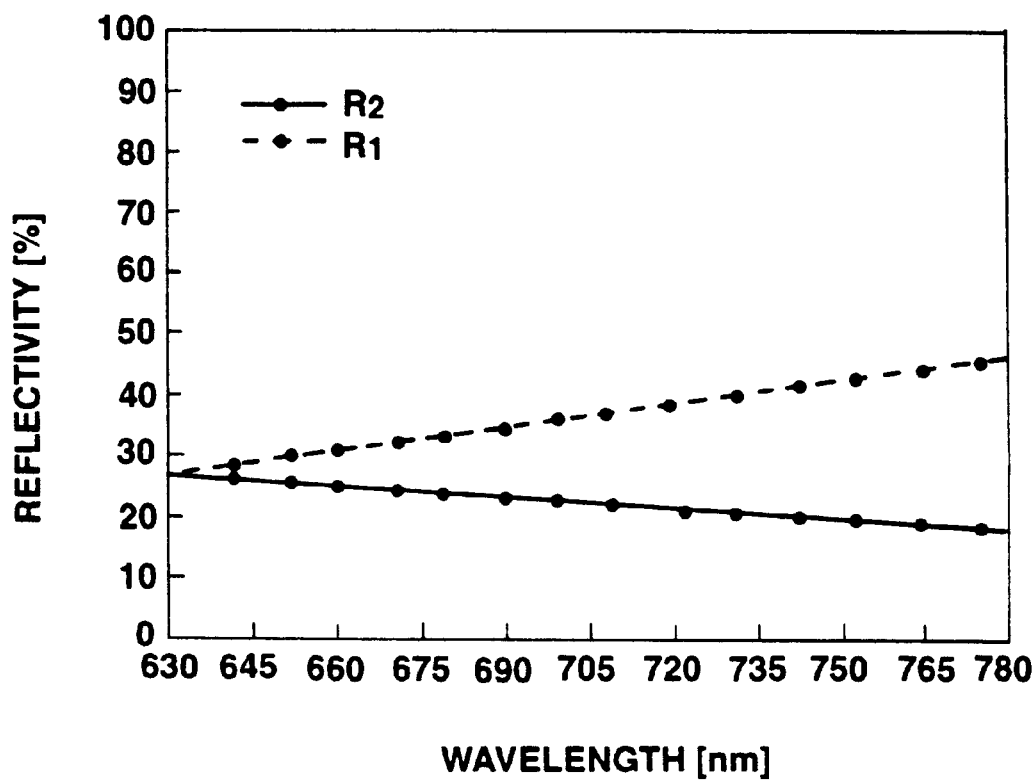
FIG. 10 is a graph showing the spectroscopic characteristic of the reflection factor of a multilayer optical disk having two information storage layers which are Si films.

As a result, the reflection factor of each Si layer had no dependency upon the wavelength as shown in FIG. 10. Since the reflection factor is, in particular, low with respect to light having the wavelength of 780 nm, the compatibility with the compact disk and the like cannot be maintained.

Note that the present invention has the structure such that the information storage layer corresponding to the light beam having the wavelength of 780 nm is formed in a CD format that can be reproduced by a compact disk player. On the other hand, the information storage layer corresponding to only the light beam having the wavelength of 635 nm is recorded at a density higher than, for example, that of the CD format.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of manufacturing a multilayer optical disk, comprising the steps of:

forming a first substrate having a first information storage area structured such that information stored therein is capable of being reproduced with a first light beam having a wavelength of 770 nm to 830 nm;

forming a second substrate having a second information storage area structured such that information stored therein is capable of being reproduced with a second light beam having a wavelength of 615–655 nm but which is relatively transparent with respect to said first light beam; and bonding said first substrate to said second substrate together without said first and second said information storage areas facing each other.

2. The method of claim 1, wherein the first substrate is formed using an injection molding process.

3. The method of claim 1, wherein the second substrate is formed using an injection molding process.

4. The method of claim 1, wherein the first information storage area comprises an Al film layer.

5. The method of claim 1, wherein the second information storage area comprises one or more layers of a Si—N film.

6. The method of claim 1, wherein the first information storage area has a reflection factor of about 70% or more with respect to the first light beam.

7. The method of claim 1, wherein the second information storage area has a reflection factor of 20% or more with respect to the second light beam.

8. The method of claim 1, wherein the invention provides that when the second substrate is formed, projections corresponding to recording pits are formed thereon.

9. The method of claim 1, wherein the first substrate is formed with projections thereby corresponding to recording pits formatted on a compact disk recording format.

10. A method of manufacturing a multilayer optical disk, comprising the steps of:

forming a first substrate via an injection molding process, the first substrate having a first information storage area structured such that information stored therein is capable of being reproduced with a first light beam having a wavelength of 770 nm to 830 nm;

forming a second substrate via an injection molding process, the second substrate having a second information storage area structured such that information stored therein is capable of being reproduced with a second light beam having a wavelength of 615–655 nm but which is translucent with respect to said first light beam; and bonding said first substrate to said second substrate together without said first and second said information storage areas facing each other.

\* \* \* \* \*